United States Patent Office 3,231,407
Patented Jan. 25, 1966

3,231,407
PROTECTION OF CHARCOAL AND PASTEL CRAYON DRAWINGS WITH COATINGS COMPOSED OF COPOLYMERS OF N-VINYL-2-PYRROLIDONE AND VINYL ACETATE
Fred H. Mason, Stamford, Conn., assignor to Eagle Pencil Company, Danbury, Conn., a corporation of Delaware
No Drawing. Filed June 26, 1963, Ser. No. 290,630
9 Claims. (Cl. 117—45)

The present invention is concerned with protective fixative compositions of the type suitable for application to charcoal and pastel crayon drawings.

It is among the objects of the invention to provide a composition that may be spread in a thin film upon charcoal and pastel crayon drawings to form a permanent fixative that is fast-drying, to form a clear, dry, non-sticky, transparent, tough and durable, very thin film, which becomes a unitary part of the charcoal and pastel crayon drawings, which is easy to apply uniformly by spraying from an aerosol-type container, which composition is non-flammable, has an inoffensive low-level odor and which will not react chemically with the color or base of the charcoal and pastel crayon drawings, and will neither dissolve nor cause discoloration or spreading of the graphically applied areas, and which will protect such work indefinitely from the atmosphere, gas or vapor and from moisture, dirt and smudging.

The problem presented is to stabilize the color contrast effect of drawings of the charcoal and pastels with suitable union to the paper background and without change in color due to climatic, moisture and oxygen and changing natural lighting and various types of light radiation whether through or direct exposure to sunshine as well as artificial light particularly of the fluorescent type.

The invention is based upon the discovery that a solution of vinyl pyrrolidone-vinyl acetate copolymer, insoluble in water but dissolved in alcohol, when spread upon charcoal and pastel crayon drawings, will quickly dry to a non-sticky, non-adhesive, durable, tough, yet flexible, transparent film, preferably a very thin film in the order of 0.0001 to 0.001 inch in thickness, that will not affect in any way the color or integrity of the charcoal and pastel crayon drawings and will protect the same from access thereto of air, gas, vapor or moisture, and that will protect the charcoal and pastel crayon drawings from smudging, aside from the additional virtues of the composition of being non-flammable and having an inoffensive low-odor level. Preferably the solution of vinyl pyrrolidone-vinyl acetate copolymer is admixed with a fluid propellant and sprayed from an aerosol-type container in which the mixture is contained.

More particularly the composition may comprise a copolymer of vinyl pyrrolidone and vinyl acetate dissolved in ethyl alcohol containing isopropyl alcohol and also containing a mixture of dichlorodifluoromethane and monochlorotrifluoromethane preferably in equal parts by weight.

A satisfactory copolymer is one containing over 30 to 40% of the monomeric vinyl acetate and desirably over 50% of the vinyl acetate with the balance being monomeric N-vinyl-2 pyrrolidone. Desirably, the copolymer is formed by heating the monomers in a benzene solution at about 60° C. for 48 hours for 20 to 48° C. until the desired molecular weight of 20,000 to 60,000 is achieved. A catalyst such as benzoyl peroxide or azo bis-isobutyronitrile may be used. Then the copolymer is precipitated by hexane.

This copolymer is then desirably dissolved in isopropyl alcohol to give a 30 to 70% solution and preferably a 50% solution and this solution is then mixed with the ethyl alcohol in the proportion of about one part of the solution to 4 to 10 parts of the ethyl alcohol.

Desirably, the amount of isopropyl alcohol should not exceed 10 to 30% of the ethyl alcohol and the copolymer should not exceed 5 to 20% of the alcohols, while the alcohol present should not exceed 15 to 50% of the chlorofluoromethane.

One embodiment of the composition that has been found to be outstandingly useful for the purpose of the invention consists essentially of:

(1) Vinyl pyrrolidone vinyl acetate water insoluble copolymer.
(2) Ethyl alcohol and isopropyl alcohol.
(3) Propellant of dichlorodifluoromethane or monochlorotrifluoromethane or both, desirably in equal parts by weight.

The spray composition may be contained in an aerosol-type can, from which it is ejected upon the charcoal and pastel crayon drawings in a spray under the propulsive force of the propellant. The dichlorodifluoromethane and monochlorotrifluoromethane are dissipated immediately for the most part with the residue slowly volatilizing with the alcohol as a constant boiling mixture. When the residue finally dries it will leave upon the work of art a very thin, non-sticky, dry, tough, transparent permanent protective film of vinyl pyrrolidone vinyl acetate copolymer.

The initial film contains a minor proportion of the ethyl and isopropyl alcohol and dichlorodifluoromethane and monochlorotrifluoromethane retained therein, ranging from 2 to 10% which slowly evaporates or is lost after deposition.

The composition dispensed by spraying from an aerosol-type container contains the following components in proportions as follows:

|   | Parts by weight |
|---|---|
| (1) Vinyl pyrrolidone vinyl acetate copolymer 20,000 to 60,000 molecular weight | 30 to 50 |
| (2) Ethyl and isopropyl alcohol | 200 to 300 |
| (3) Dichlorodifluoromethane and/or monochlorotrifluoromethane | 600 to 800 |

In the specific composition the proportions are as follows:

|   | Parts by weight |
|---|---|
| (1) Vinyl pyrrolidone vinyl acetate copolymer 40,000 molecular weight | 40 |
| (2) Substantially moisture-free denatured ethyl alcohol and isopropyl alcohol | 270 |
| (3) Dichlorodifluoromethane and monochlorotrifluoromethane in equal parts | 720 |

As another composition it is possible to use:

|   | Parts by weight |
|---|---|
| Copolymer (30,000) | 30 |
| Ethyl alcohol | 200 |
| Isopropyl alcohol | 25 |
| Chlorofluoromethane | 500 |

As still another composition which may be used:

|   | Parts by weight |
|---|---|
| Copolymer (50,000) | 35 |
| Ethyl alcohol | 150 |
| Isopropyl alcohol | 20 |
| Chlorofluoromethane | 400 |

Desirably, the chlorofluoromethane set forth above should have between 25 to 75% of the two compounds, one being dichlorodifluoromethane and monochlorotrifluoromethane in equal parts.

When the fixative composition is applied by spraying from the aerosol-type container upon the charcoal and pastel crayon drawings, it dries thereupon to form a dry non-adhesive, non-sticky, tough, waterproof, thin, clear, transparent, flexible film, preferably 0.001 to 0.0001 of an inch in thickness, that closely adheres to and protects the charcoal and pastel crayon drawings substantially indefinitely, from smudging and from access of water, gas or vapor thereto, such film being also resistant to smudging and rubbing.

By the use of vinyl pyrrolidone vinyl acetate copolymer having a molecular weight of about 40,000, the protection against light is achieved so that there is only a negligible loss of color values of less than 5%.

Desirably, the molecular weight should range between 20,000 to 60,000 and the copolymer is desirably incorporated into the final mixture in the form of a solution in isopropyl alcohol. The isopropyl alcohol should always be used in such proportion that it will constitute less than 50% of the ethyl alcohol present and desirably from 10 to 25% of the ethyl alcohol present and thus retard too rapid evaporation of the solvents after they have been deposited in the form of a thin film. Furthermore, the amount of vinyl acetate should be at least in the amount of 25 to 30% of the copolymer and it desirably may constitute as much as 60 to 80% of the copolymer. These proportions are most desirable since the final film, although extremely thin, will not be subject to attack by water or by excess humidity and at the same time will not tend to combine with the charcoal or pastel materials to reduce their color values or to change their desired appearance with the passage of time and ageing.

The polymer of a more reactive type would affect the color value and would also change the overall color effect. If of less reactive type, it would afford insufficient protection against light and changing climatic conditions which widely vary both geographically and from winter to summer. For example, polystyrene will not give satisfactory protection nor will vinyl acetate or chloride by themselves. They either polymerize to too great a degree in the film or cause reaction with the color values, and it was only after many experiments that the copolymer was selected, and this copolymer has now been found to be most suitable in life tests extending for three to four years.

In the present invention, the film is compatible with particles of charcoal or pastels so that successive layers of pastel and/or charcoal may be formed and the surface of the film may be drawn upon for additions and corrections.

The composition unexpectedly produces a dull matte finish which surprisingly does not affect color values by reflection or refraction or because of the dull surface.

The dichlorodifluoromethane does not altogether immediately flash off in the applicant's procedure, but is partly carried over onto the charcoal or pastel drawing and aids in the film formation. For example, whereas the starting proportions in the spray may be 200 to 300 parts of alcohol and 600 to 1000 parts of dichlorodifluoromethane and/or monochlorotrifluoromethane, the deposit proportions will be about 200 to 300 parts of alcohol and 20 to 50 parts of the dichlorodifluoromethane. This results in an integration of film and spreading without spots or unevenness. The alcohol and dichlorodifluoromethane and/or monochlorotrifluoromethane will slowly evaporate as a constant boiling mixture after deposition and with unusual evenness of film giving effective film protection without subsequent polymerization which would effect the delicate color value.

In the film deposited, the composition may be:

| | Parts by weight |
|---|---|
| Copolymer (40,000) | 90 |
| Alcohol | 8 |
| Chlorofluoromethane | 2 |

As another film composition it is possible to have:

| | Parts by weight |
|---|---|
| Copolymer (50,000) | 92 |
| Alcohol | 6 |
| Chlorofluoromethane | 2 |

In the above compositions the isopropyl alcohol may be omitted and the copolymer initially dissolved to form a 40 to 60% solution in ethyl alcohol. The alcohol used should always be a saturated aliphatic alcohol having from 1 to 4 carbon atoms and desirably 2 to 3 carbon atoms.

Dichlorodifluoromethane may also be used by itself.

Desirably the smooth unspotted protective dull matte will cover a smudgeable charcoal or pastel drawing, said coating containing 90 to 95% of vinyl acetate copolymer, said copolymer having 30 to 90% of the acetate with a preferred proportion of 70% of the acetate and a molecular weight of about 20,000 to 60,000 with a preferred molecular weight of about 40,000 and less than 10% and preferably between 5 and 10% of a slowly evaporating constant boiling mixture of a low molecular weight alcohol, such as ethyl or isopropyl alcohol, and a chlorofluoromethane, such as dichlorodifluoromethane or monochlorotrifluoromethane.

As many changes could be made in the above described composition and different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A charcoal and pastel paper base drawing rendered non-smudgeable and resistant to attack or discoloration by air, gas, vapor or moisture which carries as a dry, non-sticky, tough, waterproof, thin, clear, transparent, flexible film, volatile spray deposited coating in the order of 0.001 to 0.0001 of an inch in thickness of a water insoluble N-vinyl-2-pyrrolidone vinyl acetate copolymer, said copolymer containing 30 to 90% of vinyl acetate.

2. A method of fixing smudgeable charcoal and pastel paper base drawings which comprises spraying thereon a clear, dry, non-sticky, transparent, tough, durable, thin plastic film of N-vinyl-2-pyrrolidone vinyl acetate copolymer in the order of 0.001 to 0.0001 of an inch in thickness containing a residue of 2 to 10% of low molecular weight aliphatic alcohol and chlorofluoromethane, said copolymer containing 30 to 90% of vinyl acetate.

3. A charcoal and pastel paper base drawing rendered non-smudgeable and resistant to attack or discoloration by air, gas, vapor or moisture, which carries as a dry, non-sticky, tough, waterproof, thin, clear, transparent, flexible film, volatile spray deposited coating in the order of 0.001 to 0.0001 of an inch in thickness of the water insoluble N-vinyl-2-pyrrolidone vinyl acetate copolymer, said copolymer having a molecular weight of 20,000 to 60,000, said copolymer containing 30 to 90% of vinyl acetate.

4. A process of preparing non-smudgeable charcoal and pastel paper-base drawings which comprises spraying upon said drawings a film having a thickness about 0.001 to 0.0001 of an inch resulting from deposition of a coating solution containing

| | Parts by weight |
|---|---|
| (1) N-vinyl-2-pyrrolidone vinyl acetate copolymer 20,000 to 60,000 molecular weight | 30 to 50 |
| (2) Ethyl and isopropyl alcohol | 200 to 300 |
| (3) Dichlorodifluoromethane | 600 to 800 |

5. A process of preparing non-smudgeable charcoal and pastel paper-base drawings which comprises spraying upon said drawings a film having a thickness about 0.001 to 0.0001 of an inch resulting from deposition of a coating solution containing

| | Parts by weight |
|---|---|
| (1) N-vinyl-2-pyrrolidone vinyl acetate copolymer 40,000 molecular weight | 40 |
| (2) Substantially moisture-free denatured ethyl alcohol and isopropyl alcohol | 270 |
| (3) Dichlorodifluoromethane and monochlorotrifluoromethane in equal parts | 720 |

6. A process of preparing non-smudgeable charcoal and pastel paper-base drawings which comprises spraying upon said drawings a film having a thickness about 0.001 to 0.0001 of an inch resulting from deposition of a coating solution containing

| | Parts by weight |
|---|---|
| Copolymer over 30 to 40% of monomeric vinyl acetate and 10 to 70% of N-vinyl-2-pyrrolidone vinyl (30,000) | 30 |
| Ethyl alcohol | 200 |
| Isopropyl alcohol | 25 |
| Dichlorofluoromethane | 500 |

7. A process of preparing non-smudgeable charcoal and pastel paper-base drawings which comprises spraying upon said drawings a film having a thickness about 0.001 to 0.0001 of an inch resulting from deposition of a coating solution containing

| | Parts by weight |
|---|---|
| Copolymer over 30 to 40% of monomeric vinyl acetate and 10 to 70% of N-vinyl-2-pyrrolidone vinyl (50,000) | 35 |
| Ethyl alcohol | 150 |
| Isopropyl alcohol | 20 |
| Dichlorofluoromethane | 400 |

8. A method of protecting smudgeable charcoal and pastel drawings which comprises spraying thereon a thin film of a water insoluble copolymer of N-vinyl-2-pyrrolidone and vinyl acetate containing a small quantity of less than 10% of slowly evaporating solvents including a mixture of ethyl alcohol, isopropyl alcohol, dichlorodifluoromethane and monochlorotrifluoromethane.

9. A process of protecting smudgeable charcoal and pastel drawings which comprises spraying thereon thereto a thin film of a copolymer of N-vinyl-2-pyrrolidone and vinyl acetate containing a small amount of a constant boiling mixture of low molecular weight aliphatic alcohols and dichlorodifluoromethane and permitting such solvents slowly to evaporate after deposition of the coating, with the coating becoming smoother without spots and unevenness and acquiring a dull matte finish, said copolymer containing 30 to 90% vinyl acetate and having a molecular weight of 20,000 to 60,000.

References Cited by the Examiner

UNITED STATES PATENTS

| 741,763 | 10/1903 | Brown | 117—45 |
| 2,667,473 | 1/1954 | Morner et al. | 260—88.3 |
| 2,941,980 | 6/1960 | Robinson | 260—33.6 |
| 3,068,151 | 12/1962 | Haefele | 260—33.4 XR |
| 3,073,794 | 1/1963 | Stoner | 260—33.8 |
| 3,144,391 | 8/1964 | Goff | 260—33.4 XR |
| 3,145,147 | 8/1964 | Glickman | 260—33.4 XR |

OTHER REFERENCES

Shepherd "Aerosols: Science and Technology," Interscience Publishers, Inc., New York, 1961, pages 215 and 517–518.

MORRIS LIEBMAN, *Primary Examiner.*